Feb. 20, 1968 A. C. TICKLE 3,370,280
INFORMATION SHIFTING REGISTERS
Filed Jan. 28, 1964

INVENTOR
ANDREW CHARLES TICKLE
BY Hane and Nydick
ATTORNEYS

United States Patent Office 3,370,280
Patented Feb. 20, 1968

3,370,280
INFORMATION SHIFTING REGISTERS

Andrew C. Tickle, Stevenage, England, assignor to International Computers and Tabulators Limited Filed Jan. 28, 1964, Ser. No. 340,622
Claims priority, application Great Britain, Feb. 6, 1963, 4,817/63
2 Claims. (Cl. 340—174)

ABSTRACT OF THE DISCLOSURE

An information shifting register consists of a strip of thin anisotropic magnetic film having a preferred direction of magnetisation aligned with the length of the strip to which two shift conductor patterns are coupled. Information items are entered into the register by switching an area of the film. The two conductor patterns are energised alternately to produce a magnetic field pattern which causes the switched area to shift along the strip of film. A biasing field tending to reset the film to its initial state is applied to the strip of film so that a resultant field of greater magnitude is applied to the trailing edge of the switched area to ensure that the film is reset as the area is shifted while the resultant field, due to the shifting field opposed by the biasing field, acting on the leading edge of the area of smaller magnitude is insufficient to create unwanted switched areas.

Figure 1:
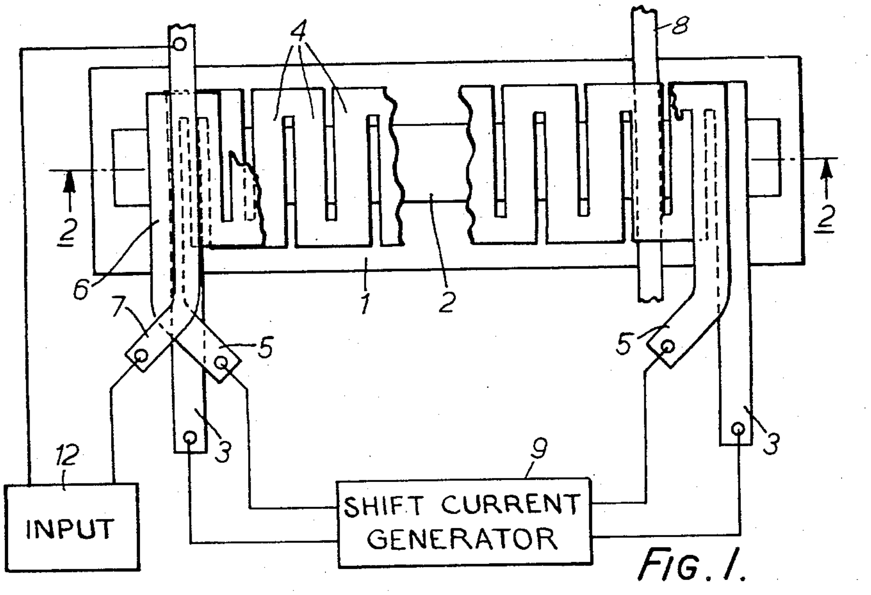

The present invention relates to information shifting registers employing thin magnetic films.

One form of information shifting registers has been disclosed in an article entitled "A Thin Magnetic Film Shift Register" by K. D. Broadbent, published in I.R.E. Transactions on Electronic Computers, September 1960 p.p. 321–3. The shifting register consists of a continuous length of thin anisotropic magnetic film which initially is in one magnetic state and an item of information is represented by a small area of film of reversed magnetic state. The information is shifted along the length of the magnetic film by magnetic fields produced by the application of shift control current pulses to two sets of shift conductors. The conductors of each set are connected in series alternately in opposite senses so that when the set of conductors is energised by a shift current pulse the magnetic field produced by any one of the conductors is in the opposite sense to the field produced by adjacent conductors of the set. The two sets of conductors are energised alternately and each set of conductors is energised by current pulses which alternately are of opposite polarity. After an information item has been entered by reversing the state of magnetisation of an area of the film, a shift current pulse is applied to one set of conductors so that a first conductor slightly displaced from the reversed area has a current flow therethrough producing a magnetic field tending to produce a reversal of magnetic state in the film and an adjacent conductor of the same set slightly displaced from the reversed area in the opposite direction has a current flow producing a magnetic field tending to reset the film to its initial magnetic state. This current pulse therefore causes the reversed area to be shifted to a position underlying the first conductor. The reset driving pulse is applied to the other set of conductors to cause further shifting of the area in the same manner so that the area occupies a position under one of the second set of conductors. The first set of conductors is then energised with a reverse polarity pulse resulting in further shifting of the area to a position underlying the next conductor of the first set. The second set of conductors is then energised with a reverse polarity pulse resulting in further shifting of the area to a position underlying the next conductor of the second set.

The fields produced by the shifting control currents must not themselves be of sufficient magnitude to create new areas of reversed magnetisation; they must merely be sufficient to cause movement of the domain walls bounding the reversed area so as to cause the area to travel along the length of the magnetic film. Furthermore, since the same shifting current pulses produce both the field at the leading edge of the area and the field at the trailing edge of the area, these fields are of equal magnitude. It has been found that one of the difficulties in operating a shifting register of this kind is that the shifted area may tend to leave isolated areas of un-reset film in its wake. There are a number of ways in which these remanent areas occur. For example, irregularities in the film itself, such as scratches, pinholes or even local irregularities in the dispersion of the easy axis may cause local reversals of state which form nuclei whose walls may be shifted and which may grow in size with the continued application of shifting fields. The boundary walls of the shifted area are irregular in outline and local irregularities in the shifting conductor pattern, caused for example by uneven spacing between adjacent conductors or between the film and the conductor in the two layers may cause isolated tips of the wall configuration to be left behind the trailing edge of the shifted area.

During succeeding information shifting operations these unwanted remanent areas may grow in size until they resemble the reversal areas corresponding to the entry of information items. Thus the register now contains spurious entries which are shifted by the control fields and are eventually read out.

It is an object of the invention to produce an improved shifting register utilising a thin magnetic film in which the formation of spurious areas of reversed magnetic state is inhibited.

According to the invention an information shifting register includes a continuous length of thin bistable anisotropic magnetic film supported as a substrate, the length of film initially being in one magnetic state in which the magnetisation vector lies in one direction aligned with the length of the film; means for applying to the film a continuous biassing magnetic field tending to maintain the entire length of film in the initial magnetic state; input means for entering an item of information by reversing the magnetic state of a small area of the film; a pattern of shift control conductors extending transversely of the length of the film and magnetically coupled therewith; means for generating shift control current pulses of one polarity and shift control current pulses of the opposite polarity, the pulses being of equal magnitude and being distributed in sequence to the conductors of the pattern to produce a magnetic field at the leading edge of the area effective to overcome the biasing field and a magnetic field at the trailing edge of the area effective to reinforce the biasing field to shift the information item representing area along the film; and read-out means at a position spaced apart from the input means in the direction of shifting responsive to the occurrence of the information item-representing area at said position to produce an output signal.

Figure 2:
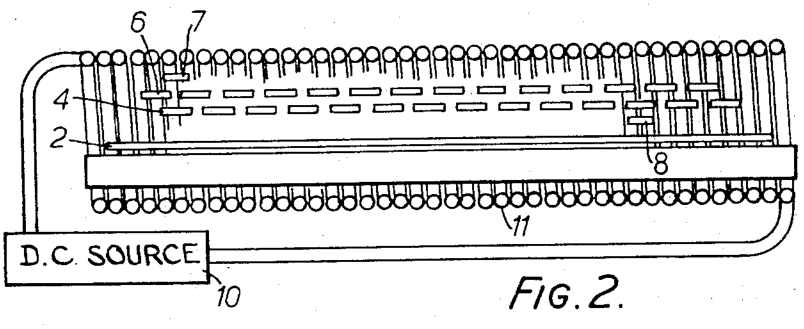
Figure 3:
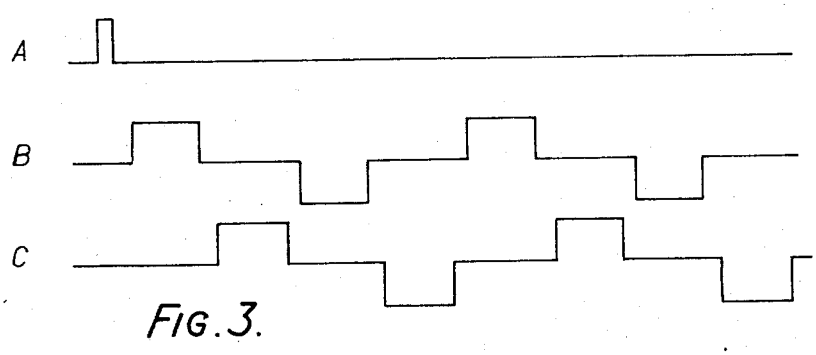

An embodiment of the invention will now be described, by way of example, with reference to the accompanying drawings in which:

FIGURE 1 is a plan view of a part of the shifting register, in which one set of shift control conductors and the magnetic bias field means are omitted for clarity, FIGURE 2 is a sectional view on the line 2—2 of FIGURE 1 and showing both sets of shift control conductors and the magnetic bias field means, and FIGURE 3 is a diagram showing the current waveforms applied to the shifting register.

The shifting register consists of a substrate 1 carrying a continuous strip of thin anisotropic magnetic film 2. The magnetic film has a preferred direction of magnetisation with the magnetisation vector aligned with the length of the strip and initially the entire strip is in one magnetic state. A first conductive strip 3 is laid down in close proximity to the film and follows a zig-zag path back and forth across the film strip. The parts of conductive strip 3 which cross the film form a set of shift control conductors 4 which lie in space parallel relationship and extend perpendicular to the preferred direction of magnetisation. A second similar conductive strip 5 is laid down over the first conductive strip 3 to form a second set of shift control conductors 6 (FIGURE 2). The strip 5 is displaced relative to strip 3 in the lengthwise direction of the magnetic film so that the shift control conductors 6 lie over the spaces between the conductors 4 as shown in FIGURE 2. An input write conductor 7 is laid over the first of the conductors 4 and extends transversely across the magnetic film. An output read conductor 8 extends transversely across the magnetic film at a position spaced lengthwise of the magnetic film from the write conductor 7. The read conductor is preferably positioned between the magnetic film 2 and the first conductive strip 3. The conductive strips 3, 5, the write and read conductors 7, 8 and the magnetic film 2 are insulated from one another by layers of insulating material (not shown).

A shift current generator 9 is connected to the conductive strips 3 and 5 and generates two similar current waveforms shown in lines B and C of FIGURE 3. The current waveforms each consist of a series of spaced apart pulses of equal magnitude and alternately of opposite polarity. The pulses of the waveform of line C are timed to occur during the intervals between the occurrences of pulses in the waveform of line B. The current waveform B is applied to the conductive strip 5 and the waveform C is applied to conductive strip 3. Thus the conductive strips are energised alternately and each energisation of one of the strips is of opposite polarity to the previous energisation of that strip.

A continuous biasing field aligned with the preferred direction of magnetisation of the magnetic film 2 and tending to maintain the entire film 2 in its initial magnetic state is generated by means of a D.C. current from a source 10 passing through a solenoid 11. The solenoid is arranged so as to produce a substantially uniform magnetic field throughout the magnetic film 2. If desired a pair of Helmholtz coils may be utilised to produce the uniform magnetic field in place of the solenoid.

An item of information is written into the shifting register by passing a current pulse (line A of FIGURE 3) from an input device 12 through the write conductor 7 so as to produce a magnetic field effective to reverse the magnetic state of the portion of magnetic film 2 underlying the conductor 7. The pulses of current in the shift control conductor 4 and 6 then cause the area of reversed magnetisation to be shifted along the length of the magnetic film 2 as follows. The first pulse applied to conductive strip 5 (line B, FIGURE 3) results in a current pulse through that conductor 6 which is slightly displaced in the direction of information shifting from the reversed area under conductor 7 (i.e. the second conductor 6 from the left of FIGURE 2), said current pulse producing a magnetic field, opposing the bias field and of greater magnitude than the bias field. This current pulse also flows through the adjacent preceding conductor 6 (i.e. the first conductor 6 at the left of FIGURE 2) but since this conductor is connected in the reverse sense the magnetic field produced by the current pulse aids the bias field and tends to reset the magnetic film to its initial magnetic state. Thus the magnetic film 2 adjacent the leading edge of the reversed area is subjected to a resultant magnetic field, equal to the difference between the bias field and the applied shift control field, tending to reverse the state of the film and the film adjacent the trailing edge of the reversed area is subjected to a resultant field, equal to the sum of the bias field and the applied shift control field, tending to reset the film to its initial magnetic state. This current pulse in the strip 5 therefore causes the reversed area of magnetisation to shift from its initial position under conductor 7 to a position underlying the second conductor 6. The generator 9 then applies a current pulse to the conductive strip 3 so that the current pulse in the first conductor 4 produces a resetting field at the trailing edge of the reversed area and the second conductor 4 produces a field effective to reverse the state of the film at the leading edge of the reversed area. This results in shifting of the reversed area of magnetisation to a position underlying the second conductor 4.

The generator 9 reset applies a current pulse of opposite polarity to the conductive strip 5. Since the conductors 6 are connected alternately in opposite senses, this current pulse of opposite polarity produces a magnetic field tending to reset the film underlying the second conductor 6 and a magnetic field tending to reverse the state of the film from its initial state underlying the third conductor 6. This results in shifting of the area of reversed magnetisation to a position underlying the third conductor 6. Similarly the reset pulse of opposite polarity applied to conductive strip 3 results in shifting of the area to a position underlying the third conductor 4.

The formation of spurious area of reversed magnetisation is presented by the increased trailing edge field resulting from the addition of the bias field to the shift control field. It will be seen that at the leading edge the bias field opposes the shift control field. In order that the leading edge field be sufficient to cause shifting, the shift control field is increased and this results in an additional increase in the magnitude of the trailing edge field. In this way the trailing edge field may be made, for example, three times as great as the leading edge field and is, in consequence, of sufficient magnitude positively to switch the film behind the trailing edge of the shifted area of reversed magnetisation into its initial state. It will be appreciated however that the upper limit to the magnitude of the bias field must below the point at which the bias field by itself would reset the entire film area.

The increase of driving current referred to above is limited primarily by the requirement that the resultant leading edge field acting upon the coupled area of film is sufficient only to shift the information-item-representing area without itself being of sufficient magnitude to create a more extensive area. A secondary factor limiting the increase of driving current is related to the existence of a magnetic field gradient caused by the application of driving current to strip line conductors. That is to say, where such a conductor is spaced at a small distance from the film, such as is the case where a layer of insulation is interposed between conductor and film, for example, the field intensity coupling with the film is not uniform over the entire width of the conductor, but is greater along the central axis of the conductor and falls off toward the outer edges. Thus, this field distribution corresponds to that apparently produced by a narrower conductor and the field gradient is greater as the drive current or as the space between film and conductor is increased. The practical lower limit of driving current which may usefully be employed is reached when the leading edge domain boundary tends to break up due to the preferential shifting of isolated peaks of the irregularly shaped leading edge boundary wall as previously noted.

Thus, in setting the value of the shifting fields, the leading edge field is adjusted so that at its maximum it is slightly below the value at which spurious information-item-representing areas would be created. The trailing edge field, of course, has a much higher value but there is no upper limit to this field set by the performance of the device.

I claim:

1. An information shifting register including a continuous length of thin bistable magnetic film supported on a substrate, said film having a first stable magnetic state in which the magnetisation vector lies in one direction aligned with the length of the film and a second stable magnetic state in which the magnetisation vector lies in the opposite direction aligned with the length of the film, said length of film initially being in said first stable magnetic state; means for applying to the length of film a continuous biasing magnetic field in said one direction having a magnitude less than that required to switch the film from the second to the first stable state; input means operable to produce an area of film in said second state representing an information item; a plurality of shift control conductors arranged along the length of film and extending transversely of the length of film; shift control means operative to energize the conductors cyclically with current pulses of equal magnitude and first and second polarity to produce a magnetic field pattern effective at one edge of said area to overcome biassing field and effective at the other edge of said area to reinforce the biassing field to shift the area along the length of the film; and read means at a position spread from the input means in the direction of shifting responsive to the area being at said position to produce an output signal.

2. An information shifting register including a continuous length of thin bistable anisotropic magnetic film supported on a substrate, said film having a first stable magnetic state in which the magnetisation vector lies in one direction aligned with the length of the film and a second stable magnetic state in which the magnetisation vector lies in the opposite direction aligned with the length of the film, said film initially being in said first stable magnetic state; a multi-turn conductive coil encompassing the length of magnetic film with its axis parallel to the length of the film; a source of direct current connected to the coil to produce a magnetic field acting in said one direction and having a magnitude less than that required to switch the film from the second to the first stable magnetic state; an input conductor extending transversely of the length of film; information input means operable to energize the input conductor with a current pulse effective to produce an area of film in said second stable magnetic state representing an information item; first and second series of shift control conductors extending transversely across the length of film, the conductors of each series being spaced apart along the length of film with the conductors of one series lying over the spaces between the conductors of the other series; a shift current pulse generator operative to generate first and second polarity alternately, current pulses of first and second series of conductors alternately, each series of conductors being energized with current pulses of first and second polarity alternately, current pulses of first polarity in odd numbered conductors of the first and second series being effective to generate a first magnetic field in said one direction to reinforce the biassing field and in even numbered conductors of the first and second series being effective to generate a second magnetic field in said opposite direction equal in magnitude to said first field to overcome the biassing field, said first and second magnetic fields being effective to shift an area of film in said second state along the length of the film; and a read conductor extending transversely of the length of film at a position spaced from the input conductor in the direction of shifting responsive to an area of film in said second state at said position to produce an output signal.

References Cited

UNITED STATES PATENTS

| | | | |
|---|---|---|---|
| 3,134,965 | 5/1964 | Meier | 340—174 |
| 3,084,336 | 4/1963 | Clemons | 340—174 |
| 3,316,543 | 4/1967 | Tickle | 340—174 |

OTHER REFERENCES

Broadbent: A Thin Film Shift Register, September 1960, 340–174SR, IRE Trans. vol. EC–9, #3.

BERNARD KONICK, *Primary Examiner.*

J. W. MOFFITT, *Examiner.*

P. SPERBER, *Assistant Examiner.*